United States Patent [19]

Hart et al.

[11] Patent Number: 4,853,864

[45] Date of Patent: Aug. 1, 1989

[54] MAILING SYSTEMS HAVING POSTAL FUNDS MANAGEMENT

[75] Inventors: William G. Hart, Stamford; Michelle S. Breault, Fairfield; Ronald P. Sansone, Weston; Michael P. Taylor, Norwalk; Terrence M. Doeberl, West Redding, all of Conn.

[73] Assignee: Pitney Bowes Inc., Stamford, Conn.

[21] Appl. No.: 904,526

[22] Filed: Sep. 5, 1986

Related U.S. Application Data

[63] Continuation-in-part of Ser. No. 813,445, Dec. 26, 1985.

[51] Int. Cl.[4] .............................................. G06F 15/20

[52] U.S. Cl. ........................... 364/464.02; 364/464.03

[58] Field of Search ........... 364/464, 466, 900, 464.02, 364/464.03

[56] References Cited

U.S. PATENT DOCUMENTS

| | | | |
|---|---|---|---|
| 3,792,446 | 2/1974 | McFiggins et al. | 364/900 |
| 3,890,492 | 6/1975 | Manduley et al. | 364/466 |
| 3,978,457 | 8/1976 | Check, Jr. et al. | 364/200 |
| 4,097,923 | 6/1978 | Eckert, Jr. et al. | 364/900 |
| 4,301,507 | 11/1981 | Soderberg et al. | 364/900 |
| 4,447,890 | 5/1984 | Duwel et al. | 364/900 |
| 4,511,793 | 4/1985 | Racanelli | 235/462 X |
| 4,639,873 | 1/1987 | Baggarly et al. | 364/466 |
| 4,663,748 | 5/1987 | Karbowiak et al. | 370/90 X |

*Primary Examiner*—Parshotam S. Lall
*Assistant Examiner*—Edward R. Cosimano
*Attorney, Agent, or Firm*—Donald P. Walker; Melvin J. Scolnick; David E. Pitchenik

[57] ABSTRACT

A system for processing batch mail in which the need for on-site inspection is unnecessary. The mail sender purchases postage from a central station thereby authorizing him to send mail equal to the amount of postage purchased. The mail sender processes batches of mail each of which is accompanied by a statement summarizing the type and number of mail pieces sent and amount of postage for each batch. The statement contains data that allows mail payment verification. The system further provides for postal funds transfer between the various mailroom devices and centralized accounting for the mailing operation.

14 Claims, 8 Drawing Sheets

ROUTINE FOR FUNDS TRANSFER BETWEEN MASTER SERVER AND SLAVE SERVER OR METER

DEMAND BASED ON POSTAGE REQUEST

AUTOMATIC FUNDS UPDATING

MAILING SYSTEMS HAVING POSTAL FUNDS MANAGEMENT

RELATED CASES

This is a continuation in-part application of copending application having Ser. No. 813,445 filed Dec. 26, 1985. Subject matter similar to the subject matter contained in the instant application may be found in U.S. patent application entitled "Postage and Mailing Information Applying System" by Ronald Sansone, et. al., filed Aug. 6, 1985, having Ser. No. 762,994, now U.S. Pat. No. 4,725,718, and assigned to the assignee of the instant application.

BACKGROUND OF THE INVENTION

Certain organizations dispatch large amounts of mail usually on a periodic basis. Examples of such organizations are: banking institutions, utility companies, insurance companies, credit companies, and the like. With such large quantities, these mailers normally pre-package and pre-sort their mail and are given a lower postage rate by the postal service because of the time saved by the postal service. There are generally two ways by which such mail senders can apply postage to their mail. The most common way is by use of a postage meter that is leased by the mail sender from a postage meter manufacturer with which the amount of postage required is applied to each mail piece. Inserter systems have been developed whereby inserts may be placed into an envelope and the envelope may be sealed, addressed and have a postage indicia applied thereto. The mail pieces may be weighed on the fly or individual weighing may not be required if all the mail pieces are of like kind, i.e., only a sample mail piece need be weighed. These acts of processing mail may be performed at a relatively high rate of speed.

A second method of mailing large quantities of mail pieces is the permit mail system. In such a system, the mail sender places a permit number on the mail pieces and prepares a manifest listing that shows the type and number of mail pieces being mailed on each occasion and the postage required.

With both such systems, inspection at the site of the mail sender is required. In the case of the postage meter, the lessor of the postage meter, i.e., the postage meter manufacturer, is required by law to inspect the postage meter at least twice a year to ensure that there is no evidence of tampering with the postage meter that would indicate an attempt to obtain unauthorized postage. In the case of permit mail, large quantities of the same type of mail will be mailed at one time and the postal service will conduct an inspection to verify that the manifest listing accompanying the permit mail accurately accounts for the amount of postage due for the mail that has been processed by the postal service. This is accomplished through an inspection on the part the postal service by examining the records of the mail sender on every occasion.

Obviously, each of these two systems has certain drawbacks. In the case of on-site inspection of postage meters, with the large number of postage meters in use by large mail senders it is an expensive matter for the inspection thereof. Furthermore, postage meters that process large quantities of mail must be replaced relatively frequently because of wear. With regard to the permit mail system, the shortcoming lies in the need of the postal service to send a representative frequently to the various mail sender locations to ensure that the mail sender is accurately accounting for the quantity of mail being sent. Such a scheme is not totally reliable as it relies upon on-site verification using the mail senders records which are not secure.

A further disadvantage of conventional systems is that of ensuring that postal funds are available for the completion of the various mailings at mailroom locations and for optimum distribution of postal funds among the various locations at a particular facility.

SUMMARY AND OBJECTS OF THE INVENTION

A system has been conceived whereby a mail sender will be able to send large quantities or batches of mail without the need of on-site inspections. This is accomplished by the mail sender having a secure accounting unit similar to a postage meter in which postage value is placed by a dispensing or central station. A statement accompanying each batch of mail contains information relative to the mail and the amount of postage required. Communication between the central station and the mail sender allows postage value to be transferred to the mail sender by the central station and mailing and verification data to be sent to the central station from the mail sender. The mailing and verification data will be the same as that contained on the mailing statements that accompany the batches of mail. This system provides a central station for a large number of mail senders whereby the postal service is relieved of its obligation of having onsite inspections and the central station acts as a clearing house for the postal service through whom verification of postage can be conveniently and inexpensively achieved.

Another feature of the instant invention is that a unique serial number may be provided to the mail sender to be stored in permanent memory to identify the mail sender's accounting unit.

A further feature of this invention is that the security features of a postage meter are provided while allowing a high speed, relatively inexpensive printer to be used for printing the mail pieces.

In another embodiment, the secure accounting unit is linked with other secure accounting units and then becomes a source of funds for these other "slave" systems. Further, in accordance with the invention, electronic postage meters and the "slave" systems communicate with each other through the "master" accounting unit for the drawing down and recrediting of funds as required. The system provides for a higher level of accounting control over those previously available.

DETAILED DESCRIPTION OF THE PREFERRED EMBODIMENT

Figure 1:
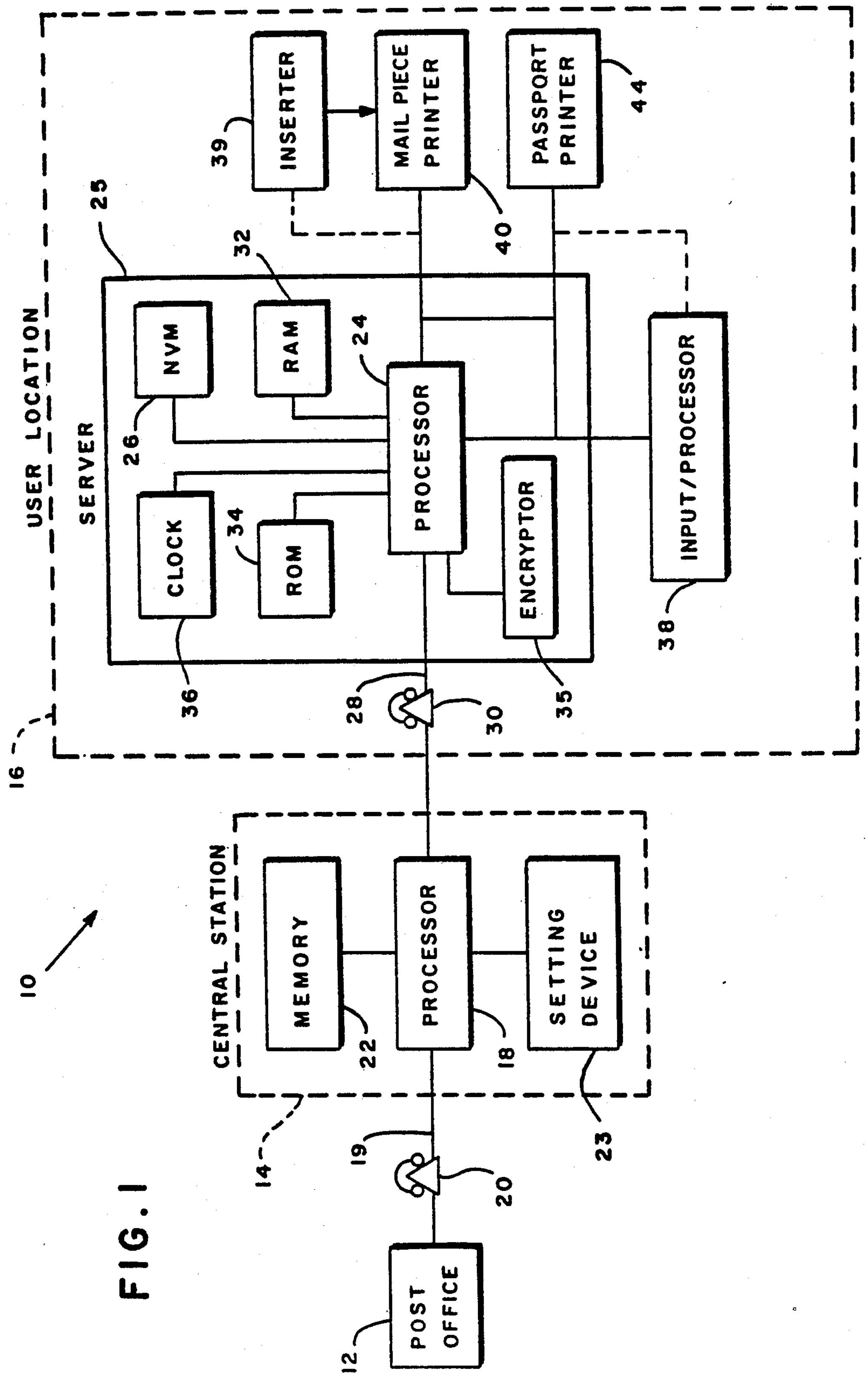
FIG. 1 is a block diagram of a batch mailing system.

Referring now to FIG. 1, a batch mailing system is shown generally at 10 and includes a post office 12, a central station 14 and a user location 16. The central station 14 has a processor 18. This processor 18 could be a main frame type of computer having substantial capacity. Communication is provided between the post office 12 and a plurality of central stations 14 (only one being shown) through a line, or communication link, 19 having a communication device such as a telephone 20 therein. Associated with the processor 18 and in connection therewith is a large storage memory unit 22 where large amounts of data can be stored and a register setting device 23 that which includes encryption software of the type required for the remote resetting of postage meters. Systems for the remote resetting of meters are well known, see for example U.S. Pat. Nos. 3,792,446, 4,097,923 and 4,447,890.

A remote user location 16 has a secure unit 25 that is hereinafter referred to as a "server". The server 25 is supplied by the central station 14 to the user and includes a user processor 24 which may be a processor of much smaller capacity such as an Intel 8085 processor available from Intel Corporation, Santa Clara, Calif. Connected to the processor 24 is a memory 26. Preferably the memory 26 will be a non-volatile memory (NVM). The user processor 24 is connected to the central station processor 18 through a communication link or line 28. A telephone 30 or other communication device may be disposed within the line 28 to selectively establish communication between the processors 18, 24. Also connected to the processor 24 are a RAM 32, a ROM 34, an encryptor 35 and a clock 36 whose respective functions will be described in detail hereinafter. An input/processor 38 is connected to the user processor 24 whereby data may be supplied, either manually or through a medium such as a disc or tape, to the user processor 24 for the purpose of providing data required in the processing of mail pieces. The input/processor 38 may be any of a large number of personal computers having keyboard and display which are commercially available, such as an IBM XT personal computer.

A high speed inserter 39 is in electrical communication with the server 25 and performs the physical acts involved in processing the mail such as the inserting of inserts into envelopes, sealing the envelope flaps, orienting the mail pieces and conveying the mail pieces to a postage meter or printer. The term "insert" includes bills, advertising materials, notices, etc., which are of a size to be received within an envelope or the like. High speed inserters of this type are readily available commercially, as for example Inserter model No. 3100 series from Pitney Bowes Inc., Stamford, Conn.

A first printer 40 is in communication with the user processor 24 of the server 25 and with the input/processor 38 and is able to print upon mail pieces 42 such as envelopes containing inserts which it receives from the inserter 39. This printer 40 is one provided by the user and will be an unsecured, high speed printer which may be controlled either through the processor 24 or through the input/processor 38. A second printer 44 is provided to print upon a statement sheet 46 or other document. This second printer 44 is preferably a secure printer that is provided by the central location 14. By secured is meant a device constructed in the same manner as a postage meter without access to the interiors thereof except by authorized personnel. An example of such a postage meter is a Model 6500 postage meter available from Pitney Bowes Inc., supra. Obviously, the second printer 44 can be an unsecured printer but this occasions greater risk in terms of verifying payment of mail. Throughout the balance of the specification and claims this statement sheet 46 will be referred to as a "passport". Details of the passport 46 will be described hereinafter in conjunction with FIG. 2.

Although only one user location 16 is shown and described, it will be appreciated that many user locations 16 will be serviced by the central station 14 as for example through multiplexing. The central station 14 may be the location of a postage meter manufacturer or other accountable organization.

In operation, the user at the user location 16 will be a sender of large quantities of mail who will be given an identification number by the central station 14 that will be placed in the NVM 26 of the server 25. This identification number will be permanent and unique for each server 25 and the user will have no access to that portion of the NVM 26 that stores the identification number. It will be appreciated that this feature may be applied to postage meters as well. Having the identification number in memory 26 eliminates the need of having a plate applied to a postage meter or a server 25. It will be appreciated that a server 25 has many characteristics of a postage meter, i.e., security, a descending register and the like, but certain elements are absent. The most evident absent element is a printer, the advantage of which is described throughout. Another absent member is an ascending register. In a postage meter an ascending register is accessable only by a service representative of the meter manufacturer and may be used to determine if any meter tampering has taken place. As will be appreciated from the description that follows, the need for an ascending register in the server 25 is obviated. Following installation of the identification number, the user will communicate with the central station 14 through the telephone 30 for the purpose of indicating to the central station 14 the amount of postage value it wishes to have accredited to its memory 26. An access code will be given to the user that can be addressed to the setting device 23 through the touch dial of the telephone 30. Upon the receipt of the access code, the user will transmit to the central station 14 the access code and his identification number and the request for an amount of postage value. The setting device 23 will function to charge, or increase, the postage value into the memory 26. This memory 26 will include a descending register that is charged by the central station 14 with the selected amount of postage value. As the user location 16 processes mail, the postage value in the descending register will be decreased in accordance with the postage required to process the mail pieces 34. Devices for charging registers such as the descending registers are well known, as for example see U.S. Pat. Nos. 3,792,446, 4,097,923 and 4,447,890.

The balance of the server 25 includes the ROM 34 that contains information that formats address signals and stores a series of programs for controlling the functions of the server 25, a RAM 32 that will hold and supply real time data, a clock 36 that will provide the time and data and an encryptor 35 that will store the code required for the descending register setting functions. The encryptor 35 can be any one of a number of encrypting devices including devices which use the Data Encryption Standards described in FIPS P4B 46, dated Jan. 15, 1977 and published by the U.S. Department of Commerce, National Bureau of Standards.

It will be appreciated that the printer 40 is a high speed, inexpensive, unsecured printer such as a ink jet printer or laser printer or any type of dot matrix printer that can apply the addresses of the addressee and addressor to the face of the mail pieces under command of the input/processor 38. In addition, other information can be printed by the printer 40 upon each mail piece 42 when under command of the processor 24. This information includes a transaction number (T.A. No.), the run of the particular batch of mail, the date and time of mailing, the class of mail and a batch number. The transaction number is that number assigned to the user location 16 by the central station 14 every time postage value is added to the server 25 and will be stored in the NVM 26. This transaction number will be the same for one or more batches of mail that are sent and will remain the same until such time as the descending register of the NVM 26 is recharged with postage value, at which time a new transaction number will be assigned and stored in the NVM in place of the preceding transaction number. By changing the transaction number upon each recharge, an element is provided for verifying postage. The batch number is one assigned by the user through the input/processor 38 whereby a given batch of mail, i.e., mail of a particular type or character, will be identified by a number assigned by the user. In addition, a run number, which is a subset of the batch, may be given to identified particular segments of the batch.

When a batch of mail is to be sent, the user will supply mailing and verification information through the input/processor 38 into the user processor 24 that will transmit at least a portion of this information to the inserter 39. This information would, for example, include the number of mail pieces to be processed and number of inserts to be placed in each envelope. The time and date may be supplied to the printer 40 through the input/processor 38 by overriding the clock 36. This overriding is useful when future mail is being processed. The user processor 24 will then command the printer 40 to print the appropriate postage, time, date, transaction number and address on the mail pieces 42 for a particular run. This run will be given a number that is associated with the particular mail to be sent, which number will be printed on the envelopes 42 of that run. As the printer 40 prints the appropriate information upon each mail piece, the number of mail pieces and amount of postage required will be determined by the processor 24. At the end of the run or batch, the second printer 44 will print authorization information upon a passport 46.

Figure 2:
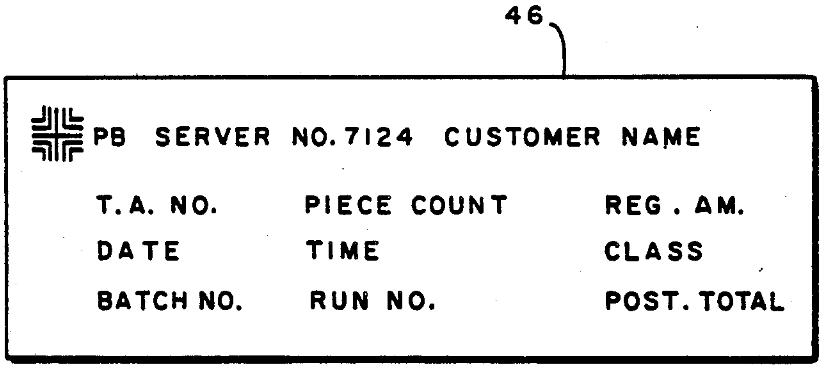
FIG. 2 is a plan view of an accounting statement that would accompany batch mail sent by the system of FIG. 1.

Referring now to FIG. 2, the passport 46 is shown after having printed thereon the total postage (Post. Total) required to mail the batch of mail, the transaction number (T.A. No.), piece count for a batch, descending register amount (Reg. Am.) after subtraction for the postage, the date, the time, the class, the batch number and the run number (optionally). Additionally, the server number, i.e., the identification number stored in the NVM 26, user name and any desired graphics can be printed. This information on the passport 46 serves many purposes. Firstly, the register amount acts as a physical record of the postage value stored in the descending register of the NVM 26. This amount is printed on the passport 46 on the upper right hand. The register amount will be that amount in the descending register after all postal charges have been made for the batch of mail to be sent. By placing this register amount on the passport 46 after the mailing of each batch, an ongoing, permanent record is maintained of the amount of postage value contained within the NVM 26. In this way, if there is a disaster wherein the server 25 is destroyed or the memory 26 therein is inadvertently erased, the user will still have a means for verifying the amount of postage value remaining from that amount of postage value originally purchased and stored. The transaction number provides an authorization check as does the identification or server number. By changing the transaction number with each recharge of the server, one can readily determine if more postage accompanies a transaction number than is authorized. Also printed on the passport 46 will be the date and time the passport 46 is printed, the piece count, i.e., the number of mail pieces mailed in the particular batch, and the class of mail. Upon the printing of the information on the passport 46, the postage amount for the batch will be subtracted from postage value stored in the descending register of the NVM 26.

The information printed upon the passport 46 is transmitted to the central station 14 through the communication line 28 automatically after each batch, is processed so that a record is maintained through the processor 18 that communicates with memory 22. The memory 22 has an ascending register therein that corresponds to the descending register in the server 25, i.e., one is the inverse of the other. As is known, an ascending register is one that accumulates charges over a long term. Optionally, the memory 22 may have a descending register that duplicates the amounts in the descending register in the NVM 26 on an ongoing basis. By having the postage value contained within the memory 22 that corresponds to the value of the server 25, a check is constantly made to ensure that there is a correspondence between the passport 46 information and the amount of postage paid by the user. More specifically, the total amount credited to the user location 16 will be stored in memory 22 and if the amount in the ascending register exceeds that total amount available to the user, the user location 16 will be notified that there are insufficient funds. When a batch of mail is sent to a post office for processing, the passport 46 for that particular batch will accompany the mail. The postal employee can determine whether it is an authorized transmission of mail from the information contained upon the accompanying passport 46. If there is any question on the part of the postal service as to whether the information is authentic, it will contact the central station 14 through the line 19 and obtain the information from the central station 14 to verify the information contained on the passport 46. If this information is accurate, then the postal service will know that the mail is authorized, i.e., the postage for the mail has been paid. On the other hand, if there is any discrepancy, the postal service is able to act to ferret any fraud or correct any discrepancy. As is the usual practice in the use of postage meters, a user location 16 will send all its mail to an assigned post office.

Figure 3:
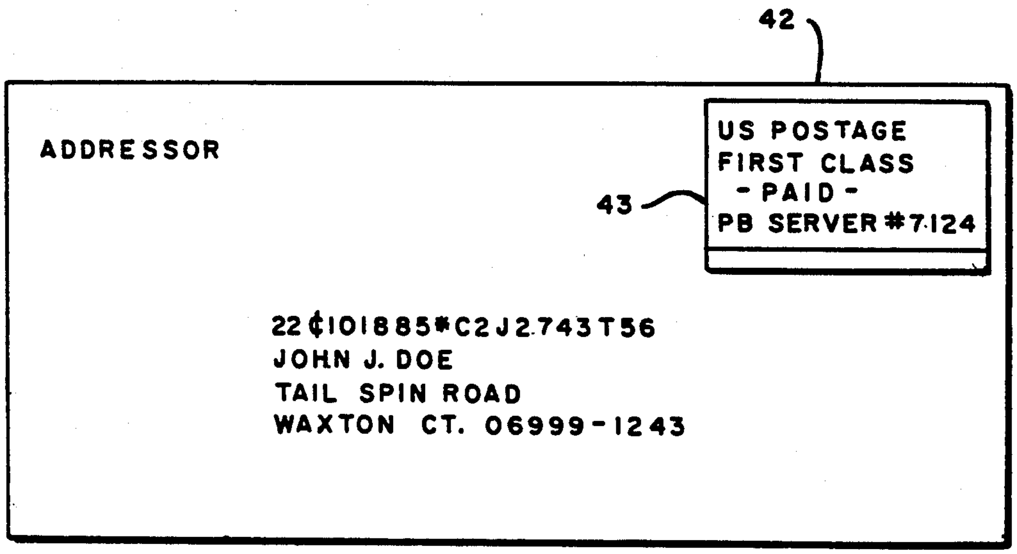
FIG. 3 is a plan view of an envelope containing information that would be applied thereto by the system of FIG. 1.

Referring now to FIG. 3, an envelope 42 is shown as it would be prepared by the present system 10. The upper left hand corner contains the address of the mail sender and the upper right hand corner contains a preprint block 43 containing the class of mail and gives the identification number of server number of the mail sender. This information may be preprinted on the envelopes 42 prior to processing of a batch. Such preprinting may be accomplished through direct communication of the input/processor 38 with the printer 44 without any participation of the other components of the user location 16.

In the processing of batch mail, the three address lines will first be printed in the address field with the name of the recipient, the street address and the city, state, zip code. The fourth line, or postage line is then printed using information supplied by the processor. This postage line, includes the postage amount $0.22, the date, Oct. 18, 1985 and the transaction number, which in this case is C2J2743T56. Other information may be given on this postage line is so desired including the time the mail is processed. Although the postage line is shown in alphanumerics it will be appreciated that the same may be printed in bar code and, optionally, bar code address information may be printed on the envelope as desired. Additionally, the information in the pre-print block 43 may be printed in the address field with the other information therein and the preprint block may be eliminated.

Although an envelope 42 shown has the postage and address information printed on the face thereof the same scheme will apply to a windowed envelope. In a windowed envelope it may be preprinted as previously described but instead of the printer 40 printing on the face of the envelope 42, an insert would be printed with the same information shown on the face of the envelope 42 and inserted so as to be viewed from the window. Alternatively, the postage and address information may be printed upon a label and the label may be attached to the envelope 42.

In this way what is provided is a method of allowing a organization to send large amounts of mail without having to frank every piece. In addition, the postal service is saved the problem of requiring on-site inspections at the user location 16 in order to verify that no unauthorized mail is being sent. By correlating the amount of postage, the transaction number, piece count, registration amount and the like, verification can be made without the need of encryption. The central station 14 more or less acts as a bank representing the postal service and handles the funds on its behalf as well as maintains records for verification. The funds or postage value charged to the server 25 may be either prepaid or charged to the user by the central station 14 on a credit arrangement. The central station 14 would be accountable to the postal service for the postage value placed in the server 25 on a immediate basis. The central station 14 may be a postage meter or server 25 manufacturer or any other reliable entity.

Another advantage of this system is that the printer 40 that prints the large numbers of mail pieces is not part of a secure member, i.e., the server 25, as in the case of a postage meter. Because of this, the printer may be replaced frequently without the expense or inconvenience of entire replacement. It will be appreciated that one printer may be used in place of the two printers 40, 44 shown and described, but the preferred embodiment contemplates the use of two printers for the reasons given.

Figure 4:
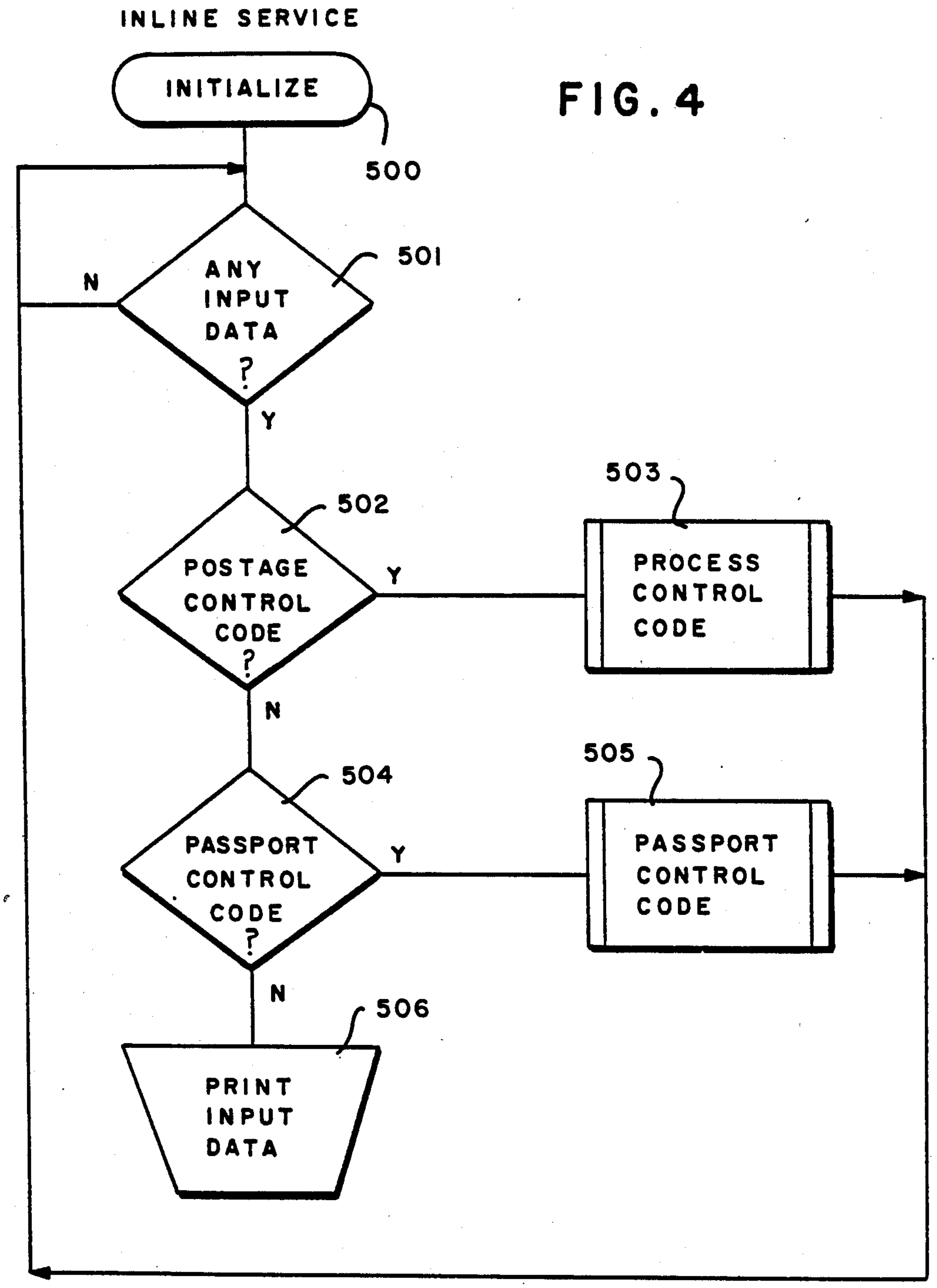
FIGS. 4–6 contain flow diagrams that describe the functions of the system shown in FIG. 1.

FIG. 4 shows briefly a background program that may be employed with the system of FIG. 1, wherein after initialization at block 500, the input to the system, e.g. via the input/processor 38, is tested at block 501. If no input is received, the program loops back to the input of block 501. If an input is detected, it is tested at block 502 to determine if a postage control code has been entered (block 502). If this code is received, the program proceeds to process the control code, at block 503, as will be described with reference to FIG. 5. If the input was a passport control code, however, as tested at block 504, the program jumps to the passport control code routine 505, as will be described with reference to FIG. 6. Any other input is printed, as noted at block 506.

Figure 5:
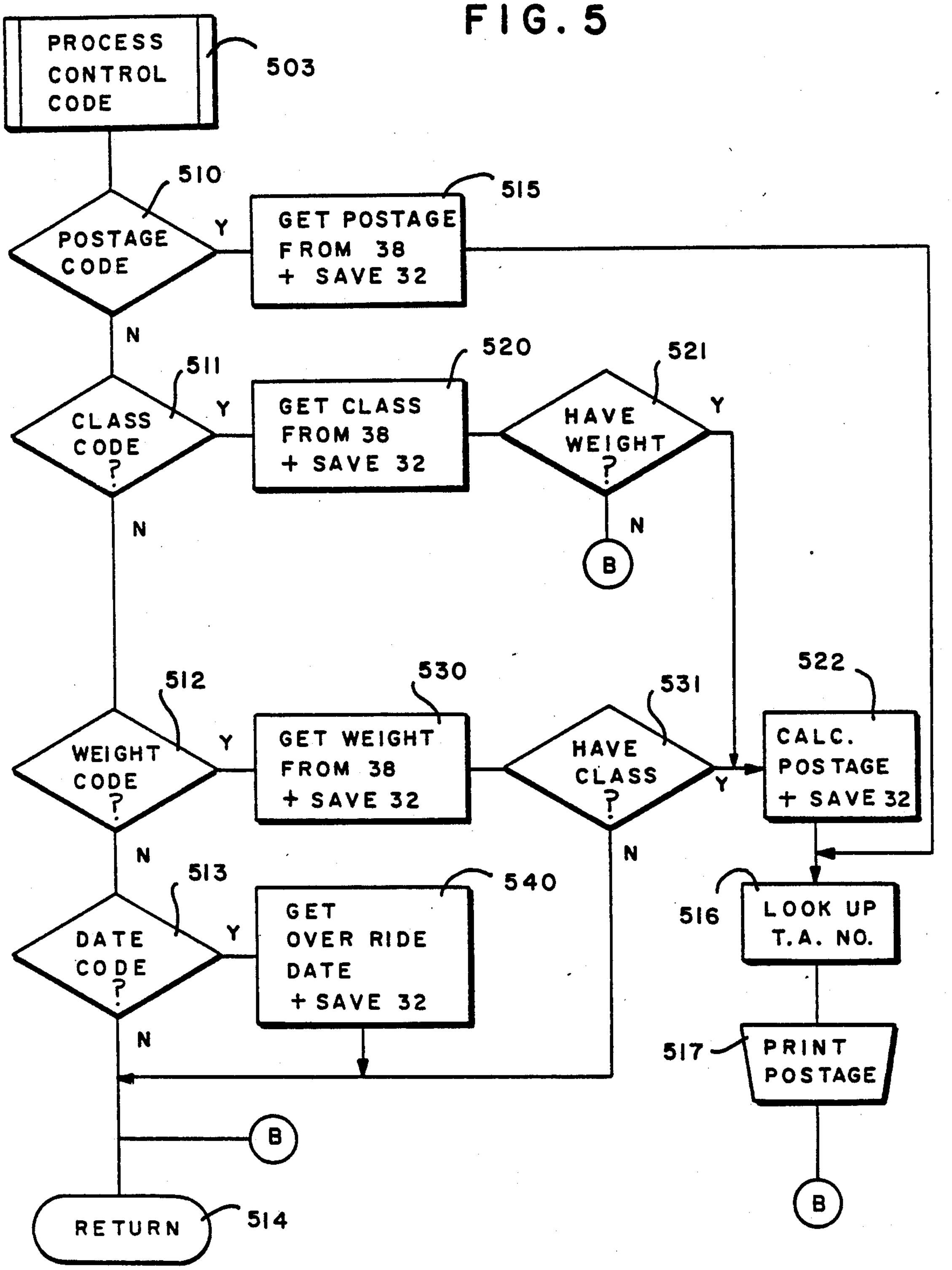

Referring now to FIG. 5, if a process control code has been input, the program tests the input to see if it was a postage code (block 510), a class code (block 511), a weight code (block 512) or a date code (block 513). If none of these codes was input, the program returns to the background program at block 514. If a postage code was input, the postage is read from the input and stored in RAM (block 515), the transaction number is read at block 516, the postage is printed (block 517) and the program returns to the background program of FIG. 4. If a class code was input, the class is read from the input and stored in RAM (block 520), and if the weight is provided, as tested at block 521, the postage is calculated and saved in RAM (block 522), the transaction number is read, and the postage is printed, following which the program returns to the background program. If weight was not previously entered, the program returns to the background program of FIG. 1 to await such input.

If a weight code was input, the weight is read from the input and saved in RAM (block 530), and a class had been previously entered, as tested at block 531, the postage is calculated and saved, the transaction number is read, and the postage is printed at block 517 before returning to the background program. If the class had not previously been entered, as tested at block 531, the program returns to the background program of FIG. 4 to await entry of this data. If the control code is a date code (block 513), then an over ride date is stored in Ram 32 and a return is made to the background program of FIG. 4.

Figure 6:
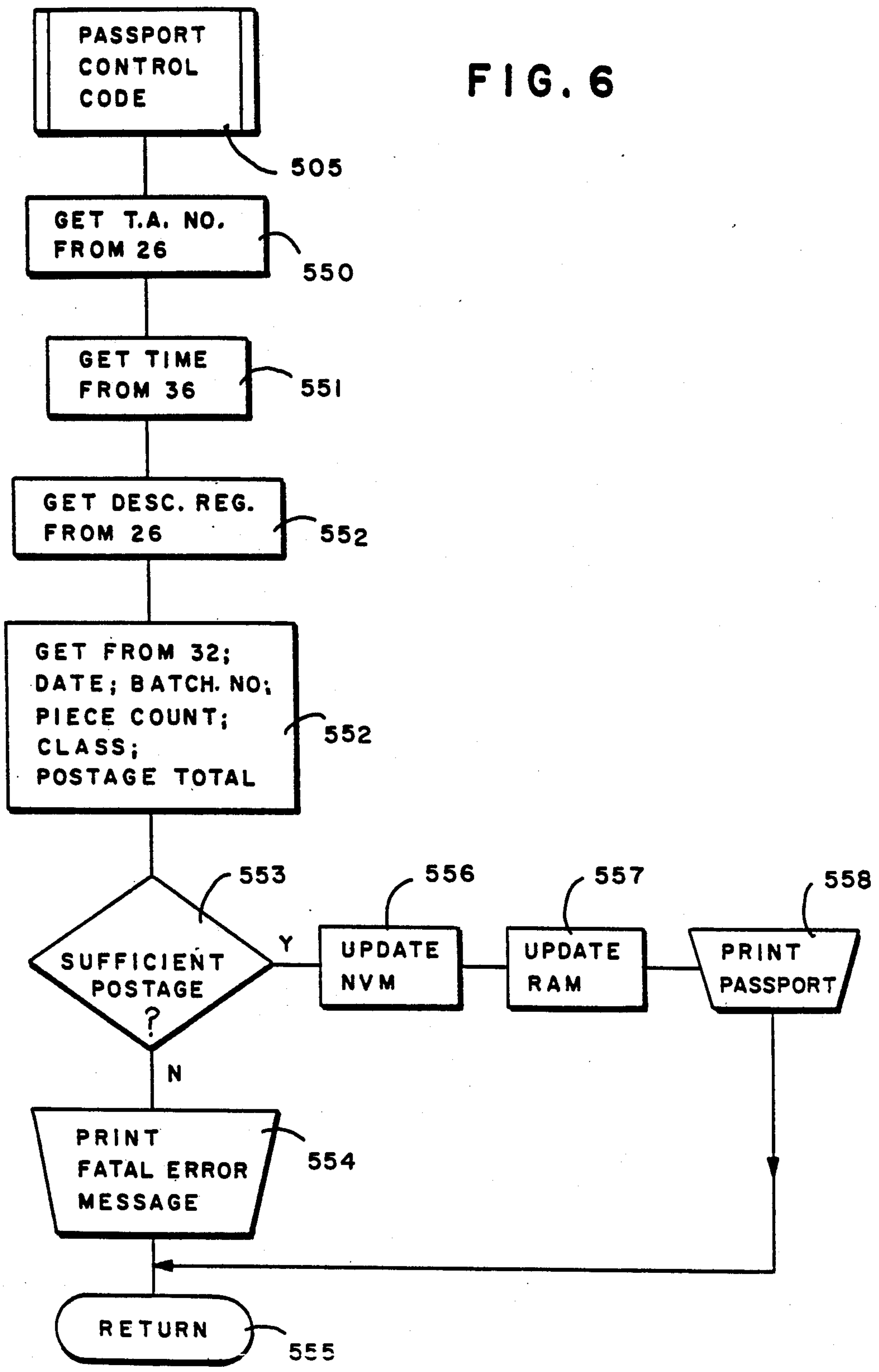

Referring now to FIG. 6, if the input was a passport control code, the transaction number is read from the nonvolatile memory (block 550), the current time is read from the clock 36 (block 551), the descending register is read from the non-volatile memory (block 26), and the data, batch number, piece count, class and postage total are read from the RAM 32 (block 552). If there is sufficient postage available, as tested at block 553, the values in the non-volatile memory and RAM are updated (blocks 556 and 557), in accordance with the batch of mail being processed, and the passport is printed (block 558). The program then returns to the background program of FIG. 4. If, on the other hand, the register does not indicate the presence of sufficient postage, a fatal error message is printed at block 554, and the program returns to the background program of FIG. 4.

Figure 7:
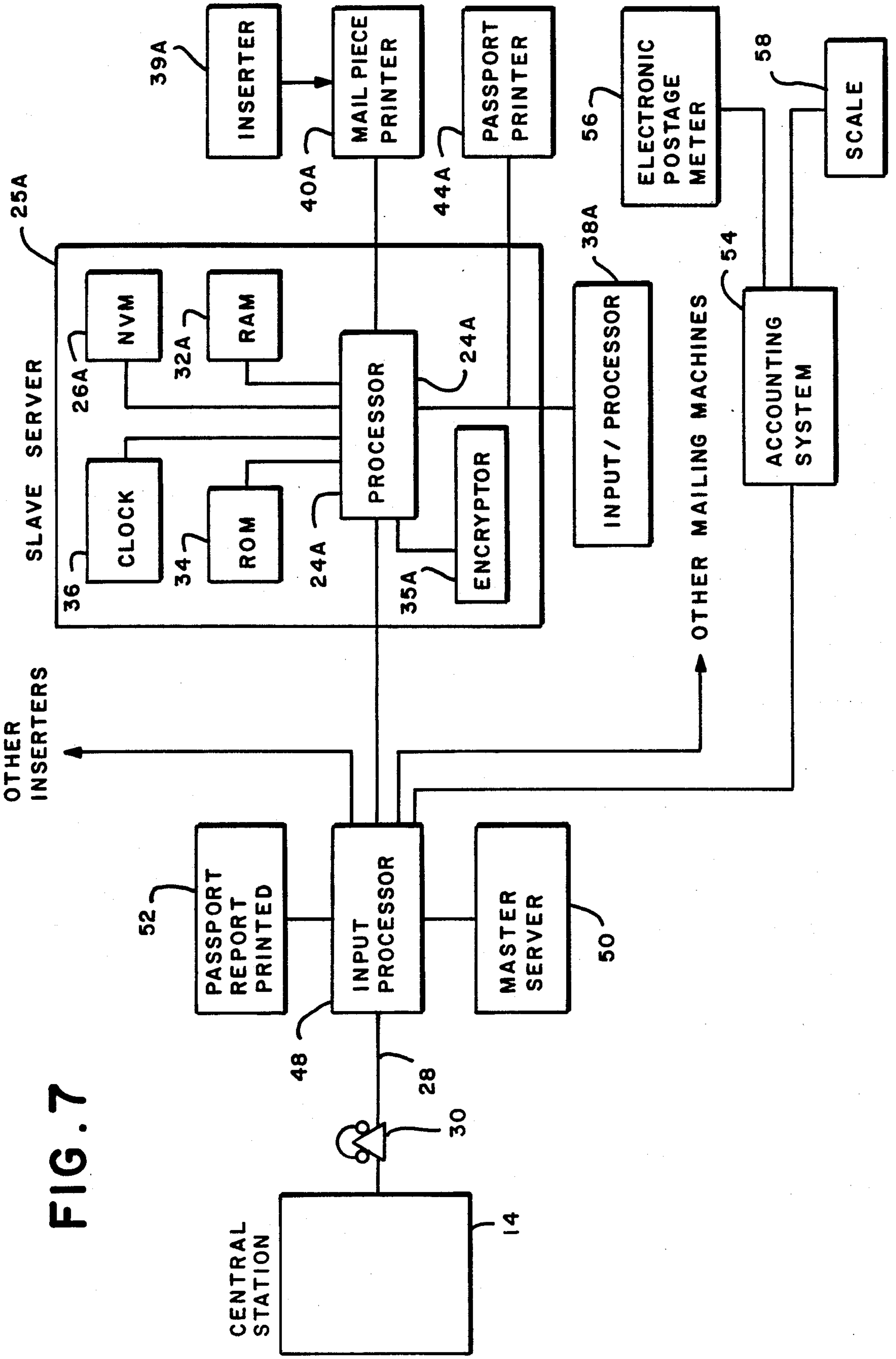
FIG. 7 is a block diagram of a mailing system including funds management.

FIG. 7 is a block diagram of a system that incorporates funds management in accordance with the invention. In this embodiment the input processor 48, which may be again a personal computer such as the IBM AT personal computer, is placed in communication with the central station 14 through line 28 which may include telephone set 30, like numerals being used for like elements previously shown in FIG. 1. The input processor 48 is connected to a server 50 shown here as a "master" server for reasons which will shortly be explained. In the preferred embodiment, the master server 50 may be a secure accounting board for accounting for postal transactions in a secure environment resistant to tampering and the rest of the server functions may be included with the software in the input processor 48. Suitable accounting circuits are shown, for example, in U.S. Pat. No. 3,978,457 specifically incorporated by reference herein. Preferably, the processor will then communicate with the secure accounting board using the interface and protocol described in U.S. Pat. No. 4,301,507.

Printer 52, which is an unsecure printer, is connected to the input processor 48 and is used for printing passports as previously described and for reports or journal printing as desired.

Input processor 48 communicates with the processor 24A of "slave" server 25A. The operation of "slave" server 25A with respect to the processing of mailpieces is exactly that previously described in connection with FIG. 1. Thus, the functions of the NVM 26A, RAM 32A, encryptor 35A, mailpiece printer 40A and passport printer 44A, are the same as those described for the corresponding structures 26, 32, 35, 40 and 44, respectively, of FIG. 1. However, with respect to the funds available in the server 25A, instead of communicating directly with the central station 14 as previously described, the present embodiment enables the transfer of funds between the server 25A and the master server 50 without the necessity of communication of funds from the central station 14 to the "slave" server 25A.

It will be understood that the input processor 48 may be connected to communicate as desired with other "slave" servers (not illustrated) associated with their respective inserters. It will also be appreciated that the "slave" server 25A may be a secure accounting board communicating with the input processor 48 as described in the above with respect to the "master" server.

An accounting system 54 which interfaces with an electronic postage meter 56 and optional scale 58 is also connected to the processor 48. The accounting system 54 suitably includes features similar to the A300 accounting system marketed by Pitney Bowes. Such a system is described, for instance in U.S. application Ser. No. 813,458 of Mallozzi, et. al. for "System for Accounting for Postage Expended by a Postage Meter Having Data Security During Printing" filed Dec. 26, 1985, and assigned to the assignee of the present invention, the disclosure of which is incorporated by reference herein.

Such an accounting system normally includes data entry apparatus and associated display and a memory for storing program data and account records, the memory further having a non-volatile memory for storing the records, an interface to the electronic postage meter 56, and a processor including a CPU connected to the data entry apparatus, the memory and the interface. Optionally, as mentioned previously there may also be an interface to the scale 58. The communication is again preferably using the interface and protocol described in U.S. Pat. No. 4,301,507.

The processor responds to entry of the postal information in accordance with the program data to transmit signals through the interface to set the postage meter 56, and then responds to a signal specifying the postage expended transmitted back from the postage meter 56 through the interface to update the account record corresponding to an account number specified by the postal information. The account records may of course be printed either by an auxiliary printer (not shown) or transmitted to the processor 48 for printing by the printer 52.

The processor 48 also serves to accumulate job related information and postal accounts at a central point. The information can be collected from each of the servers 25A or input processors 38A associated with the inserters 39A as well as from the accounting system 54.

Figure 8:
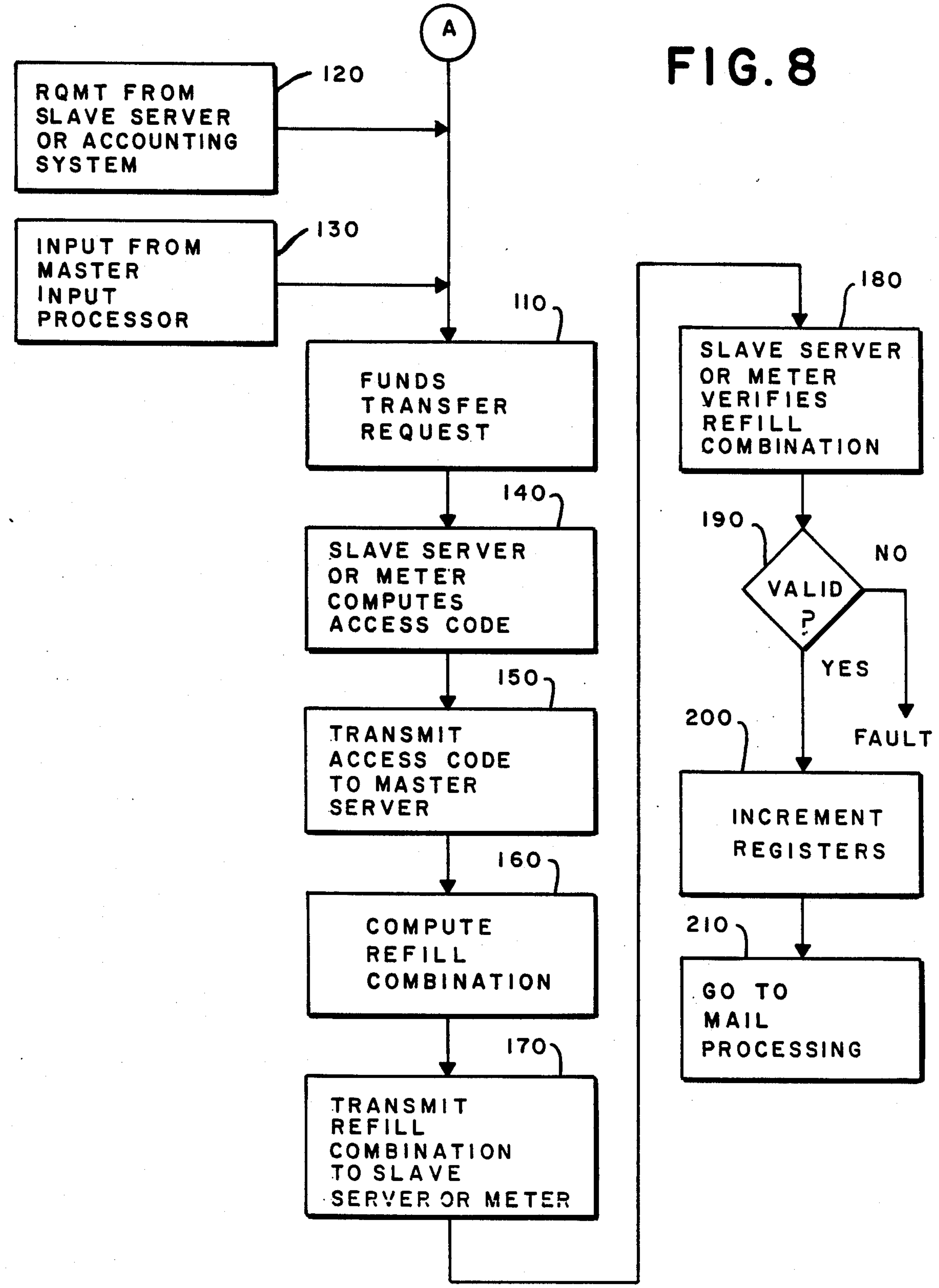
FIGS. 8–10 are flow diagrams of the mailing system of FIG. 7.

FIG. 8 shows the routine for transferring funds between the master server 50 and the slave server 25A or postage meter 56 shown in FIG. 7.

The funds transfer is initiated by a call to the block funds Transfer Request shown at 110. It is understood that the routine will cover both the downloading of funds into the slave server 25A and the meter 56 as well as the uploading of funds to the master server 50.

The funds transfer may be initiated by a manual input, block 120, from the slave server 25A or slave input processor 38A or a manual input from the accounting system 54. The transfer may also be initiated by a command from the input processor 48, block 130. The funds transfer may also be initiated automatically as will be discussed later.

Suitable routines for handling the transfer of funds in a secure manner are described for example, in U.S. Pat. No. 4,097,923 which is specifically incorporated by reference herein. It will be understood that the secure transfer of funds between the central station 14 and master server 50 may be handled in a similar manner to that disclosed in U.S. Pat. No. 4,097,923 and provided by Pitney Bowes through its remote meter resetting system. In each transfer, uploading of funds may be incorporated by the transfer of negative fund amounts. It will be understood that the system taught herein does not require voice answer back and may be implemented by direct transfer of data via modem, RS-232 serial transmission on dedicated lines, or by other suitable communication techniques well known in the art.

In accordance with procedures more completely described in U.S. Pat. No. 4,097,923, the slave server 25A or meter 56 computes an access code, block 140, and transmits the access code to the master server 50, block 150. The master server 50 computes a refill combination, block 160, and transmits the refill combination to the slave server 25A or the meter 56 which required the funds transfer, block 170. The refill combination is verified by the server 25A or meter 56, block 180, and if valid, decision block 190, the registers are incremented, block 200 and the program returns to the mail processor routine, block 210. On the other hand, if the combination is not valid, block 190, processing is discontinued (fault).

Figure 9:
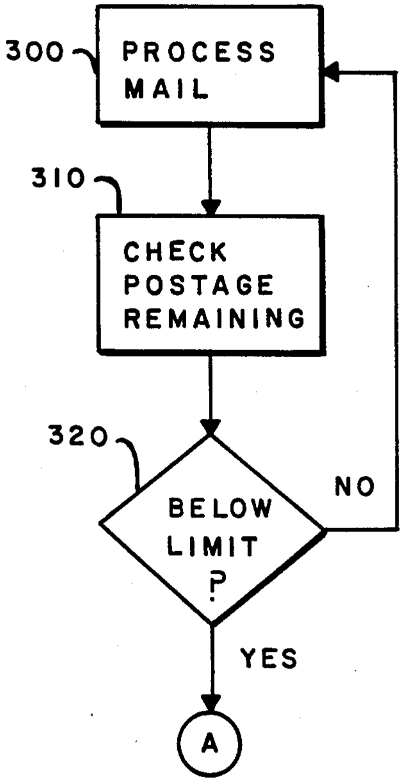

FIG. 9 illustrates a routine for the automatic updating of funds in one of the sub-units. At the end of a run for processing mail, block 300, or at predetermined time intervals if desired, the system may automatically check to make sure that the level of funds in the servers and postage meters are above a predetermined level, blocks 310 and 320. After checking block 310, assuming funds are above the predetermined minimum level, block 320, processing is returned to block 300. If the funds are below the predetermined level the request transfer routine of FIG. 8 is called, block 320.

Figure 10:
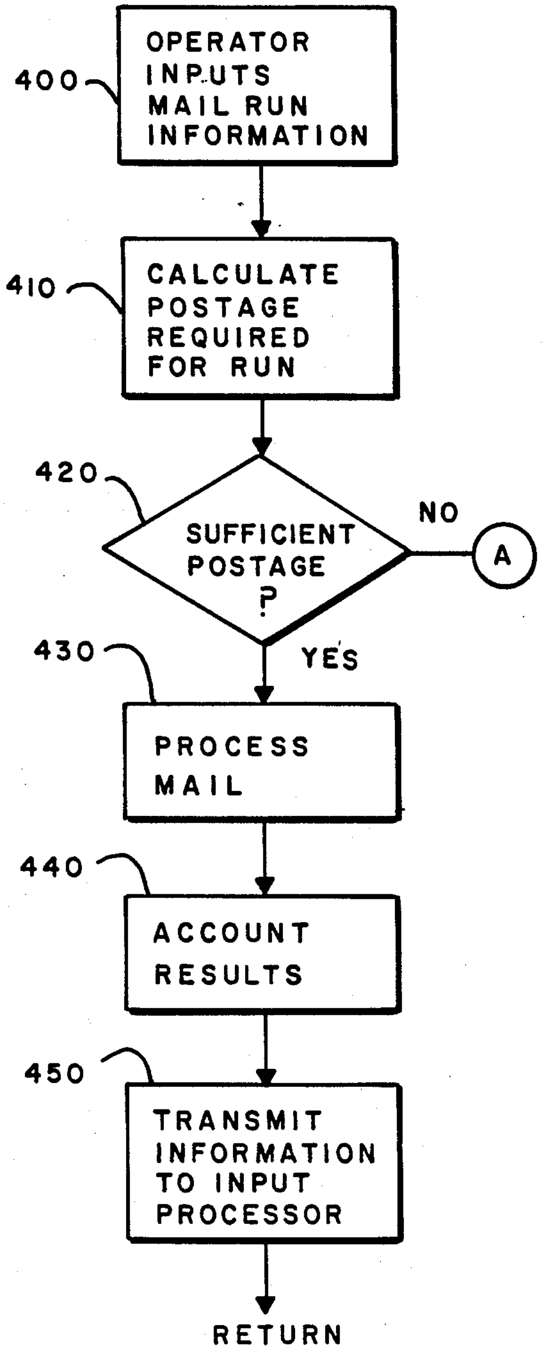

FIG. 10 is a flow diagram for a routine for a demand based postage request.

In accordance with this aspect of the invention, the operator who may be at any one of the locations, i.e., at an inserter 39A with input processor 38A, accounting system 54, or master input processor 48, inputs information as to the job characteristics, block 400. Based on such characteristics, which can include information such as, for example, counts, job ID, operator ID, machine ID, date, class/specialities, time start, time end, total pieces, actual postage, account to be charged, and job type, the input processor 38A can calculate costs and postage funds necessary for the job, block 410. It will be appreciated that these characteristics may be keyed into the input processor 48 and associated with a job ID or ticket which may later be read or keyed-in at the time of the run for calling the required information. The funds remaining in the particular apparatus is checked to determine if there is sufficient postage, block 420 and if there is a funds request, block 110 is called. If sufficient funds are available or after the device has been refilled the mail processing is initiated, block 430. The accounting is done as shown in block 440 either in the accounting system 54 or input processor 38A and the results are transmitted for storing or printing to input processor 48, block 450.

It will be appreciated that in some circumstances it may not be necessary to include the master server 50 for storage of funds, in which case the input processor 48 may serve to channel funds between the central station 14 and the appropriate device as well as to collect and display or print mail run information.. It will also be understood that while the description of this embodiment has been made with respect to one slave server 25A and one electronic postage meter 56, the system is capable of accommodating more inserters and postage meters in any of various combinations. It should also be understood that the accounting system shown at 54 may be adapted to interface with a plurality of electronic postage meters for accounting for the transactions occurring in each.

In accordance with the invention disclosed herein, funds may be shifted from the various devices communicating with the input processor 48 by uploading funds from one unit into the server master 50 and then downloading the funds into the devices requiring more funds. It will be appreciated that the funds may be similarly uploaded from the input processor 48 to the central station 14 if desired.

If desired the amount of postage available in each device may be limited to a predetermined amount. Thus mailing systems operators who perform mailruns for multiple clients can utilize credit rating and other related information to determine the extend of mailing runs performed for the client.

The system further enables funds to be stored at the central station 14 and placed in interest-bearing accounts. Funds are then drawn down through the input processor 48 on an as needed basis. Unspent funds can be transferred to other devices controlled by the input processor 48 or uploaded into the central station 14 and back into the interest-bearing account.

Because of the flexibility of the input processor 48 in conjunction with the servers and the accounting system 54 accounting can be performed for a variety of different types of devices such as inserters, mailing machines with postage meters, and manifest systems. Thus, simultaneous runs may be performed with the different devices with a much higher lever of accounting control.

What is claimed is:

1. A system for accounting for postage funds comprising:

means at a central station for processing information;

a plurality of means remote from said central station for respectively securely accounting for postage funds crediting transactions, each of said accounting means accounting for postage funds used in processing respective batches of mail, each of said accounting means including means for debiting postage funds used from postage funds credited for reducing postage funds credited;

means for establishing communication between said information processing means and each of said plurality of secure accounting means to communicate accounting information including information concerning postage funds used to said information processing means for accumulating mail processing information thereat, and means for automatically processing postage funds crediting transactions for at least one of said secure accounting means when postage funds credited therein are reduced to a predetermined minimum.

2. The system of claim 1 further comprising:

means for generating a passport, said passport including accounting information relating to a batch of mail.

3. The system of claim 1 further comprising:

means for transferring credited funds to said information processing means from at least one of said plurality of secure accounting means.

4. The system of claim 1 including means for implementing a postage funds crediting transaction for transferring postage funds from said information processing means to one of said secure accounting means after calculation of an amount of postage funds needed by said one secure accounting based on job characteristics information inputted to said information processing means.

5. The system of claim 1 further comprising:

an electronic postage meter, said electronic postage meter having one of said accounting means interfaced therewith, and said one accounting means adapted for communicating accounting information to said information processing means and to receive postage funds credits from said information processing means.

6. The system of claim 5 wherein said funds transferred from said information processing means to said postage meter are automatically transferred when funds in said postage meter reach a predetermined minimum.

7. The system of claim 1 further comprising:

an electronic postage meter, said electronic postage meter having one of said accounting means interfaced therewith, and said information processing means adapted for crediting postage funds to said electronic postage meter after calculation of the amount of postage funds required by said postage meter based on job characteristics inputted to said information processing means.

8. The system of claim 7 further comprising:

means for generating a passport, said passport including accounting information relating to said batch of mail.

9. A system for managing postal funds comprising:

first means for processing information;

secure accounting means including second means for processing information, said second means including means for accounting for postal funds available and used for a batch of mail;

means for communicating accounting information including data representative of said postal funds between said first information processing means and said secure accounting means;

an electronic postage meter;

a second accounting means communicating with said electronic postage meter for accumulating accounting information with respect to postal funds crediting transactions which provide postage funds available for use in said electronic postage meter;

means for communicating information between said second accounting means and said first information processing means, said first information processing means including means for transferring thereto data representative of postage funds from said secure accounting means and said second accounting means, and means for automatically transferring postal funds from said first information processing means to said electronic postage meter whenever postal funds available for use in said electronic postage meter reach a predetermined minimum value.

10. The system of claim 9 further comprising:

means for establishing communication between said first information processing means and a central station for transferring postal funds therebetween.

11. The system of claim 9 further comprises:

a second secure accounting means communicating with said first information processing means, said second secure accounting means including means for storing postal funds transferred thereto from a remotely located central station.

12. The system of claim 11 wherein said first information processing means further comprises:

means for calculating the amount of postal funds for a selected mail run and selectively transferring sufficient postal funds to one of said secure accounting means.

13. The system of claim 9 wherein the first information processing means includes means for accumulating and storing mail run information received from said secure accounting means and said second accounting means.

14. The system of claim 13 wherein said mail run information is inputted at said first information processing means.

* * * * *